(12) United States Patent
Gombos et al.

(10) Patent No.: US 6,202,548 B1
(45) Date of Patent: *Mar. 20, 2001

(54) METHOD OF HAY TEXTURIZING AND BALING

(75) Inventors: John M. Gombos, Ellensburg, WA (US); Moshe Leashno, Long Beach, CA (US)

(73) Assignee: A.C.X. Trading, Inc., Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/303,051

(22) Filed: Apr. 30, 1999

Related U.S. Application Data (63) Continuation of application No. 08/889,018, filed on Jul. 7, 1997, now Pat. No. 5,927,188.

(51) Int. Cl.[7] .................... B30B 9/30; B30B 15/08
(52) U.S. Cl. .................... 100/39; 100/41; 100/45; 100/97
(58) Field of Search .................... 100/39, 41, 94–97, 100/179, 189, 191, 45, 4, 19 R, 249, 20

(56) References Cited

U.S. PATENT DOCUMENTS

| | | | |
|---|---|---|---|
| 68,345 | * 9/1867 | Brown | 100/96 |
| 507,425 | * 10/1893 | Fowler | 100/19 R |
| 543,278 | * 7/1895 | Washburn | 100/189 |
| 650,494 | * 5/1900 | Sooy | 100/19 R |
| 651,018 | * 6/1900 | Neely | 100/191 |
| 854,465 | * 5/1907 | Christensen | 100/191 |
| 876,037 | * 1/1908 | Bingham | 100/191 |
| 947,039 | * 1/1910 | Hart | 100/19 R |
| 1,069,112 | * 8/1913 | Cook | 100/96 |
| 1,606,655 | * 11/1926 | Merrill et al. | 100/20 |
| 1,990,526 | * 2/1935 | Claar et al. | 100/19 R |
| 2,400,555 | * 5/1946 | Johnston | 100/19 R |
| 2,528,538 | * 11/1950 | Nolt | 100/4 |
| 4,999,987 | * 3/1991 | Eggenmueller | 100/189 |
| 5,664,491 | * 9/1997 | Maki et al. | 100/191 |
| 5,927,188 | 7/1999 | Gombos et al. | 100/45 |

* cited by examiner

*Primary Examiner*—Stephen F. Gerrity
(74) *Attorney, Agent, or Firm*—Christie, Parker & Hale, LLP

(57) ABSTRACT

A method and an apparatus for compressing hay such that the hay is suitable for long distance shipping. The hay is texturized by passing the hay through a shredder with an added fog or mist of water. The shredder separates, cuts and bends hay fibers rather than shattering the fibers. Compression of the hay is achieved by feeding the hay through an open ended compression conduit in a peristaltic manner through the use of a hydraulically actuated ram. Increased compression of the hay is achieved by applying transverse pressure to the hay as the hay travels longitudinally through the compression conduit.

11 Claims, 7 Drawing Sheets

METHOD OF HAY TEXTURIZING AND BALING

CROSS-REFERENCE TO RELATED APPLICATIONS

This application is a continuation of U.S. Ser. No. 08/889,018 filed Jul. 7, 1997, now U.S. Pat. No. 5,927,188, issued Jul. 27, 1999.

FIELD OF THE INVENTION

The present invention relates to the texturizing and high density baling of hay. In particular, the present invention pertains to the texturizing of hay to increase digestibility and the compacting of hay into high density bales of a size and weight appropriate for long distance shipping.

BACKGROUND OF THE INVENTION

A typical harvesting of hay involves cutting the hay and drying it in the field, after which it is typically pressed and bound into bales for easier handling and storage. Although field bales so compressed may be suitable for local handling and shipping, for long distance shipping hay bales of increased density are desirable in order to reduce shipping costs. For long distance shipping, especially to the overseas market for domestically produced hay, the hay must be packaged in high density units or bales capable of efficient packaging into shipping containers in order to provide for economical shipping of the hay. Efficient transportation of the hay also requires that the hay bales be of substantially uniform size and weight.

One method well known in the art for compacting hay to a high density is to create dry pellets or cubes of hay via an extrusion process. Pellets have a relatively high density, and preserve adequately as long as they are kept dry. Pellets, however, are expensive to produce. Additionally, cattle may not be able to chew or digest pellets easily because the pellets are hard and dry. Haylage, which is fermented hay, is more palatable to and digestible by livestock because it is moist and tender. haylage, however, contains a high percentage of water, causing increased shipping costs. Haylage may also spoil rapidly when exposed to air.

In order to economically ship hay long distances it has become common to double compress hay bales. That is, the standard field-baled hay is rebated into a bale of approximately one-half the prior size. Such a double compressed hay bale may often reach a density of 22 lbs/cu. ft. An even greater density is desirable for shipping in standard cargo containers used for overseas shipping.

Standard methods of compacting hay may also lead to decreased leaf retention. A substantial amount of the nutrients in many varieties of hay is found in the leafy matter attached to the stems or stalks of the hay. Forcefully compacting hay by pressing the hay against an unyielding object may result in the severing of the leafy matter from the stem or stalk. Such a result is undesirable because once the hay is placed in a trough for feeding the cattle the leafy matter, and therefore a substantial amount of the nutrients, will tend to locate in the bottom of the trough and not be eaten by the cattle. Accordingly, a means for compacting hay to increased densities while maintaining a greater amount of leaf retention than provided by conventional methods of compacting hay is desirable.

SUMMARY OF THE INVENTION

The present invention provides an apparatus and a method for texturizing and baling hay. In accordance with the present invention, hay is provided to a hopper which carries the hay on a conveyor belt through counter rotating blades of a shredder which decrease the hay stalk size and texturizes the hay. The hay is then passed through a leveler and fed into a receiving bin. Fogging misters are associated with the shredder for moisturizing the hay as required for a desired moisture content. Coupled to the receiving bin is a conduit or compression tunnel. The hay is forced through the conduit via a hydraulically actuated ram coupled to a pusher plate, the ram operating on a cyclical basis. As the hay is forced through the conduit by the pusher plate and ram, the walls of the conduit are forced towards each other by a hydraulically actuated clamp device.

The present invention thereby provides a method of compacting hay to a high density. In doing so, the present invention also texturizes the hay to lead to increased palatability and digestibility. Moreover, the above is accomplished while providing greater levels of leaf retention than is conventionally achieved.

The attendant features of this invention will be more readily appreciated as the same becomes better understood by reference to the following detailed description and considered in connection with the accompanying drawings in which like reference symbols designate like parts throughout.

DETAILED DESCRIPTION

Figure 1:
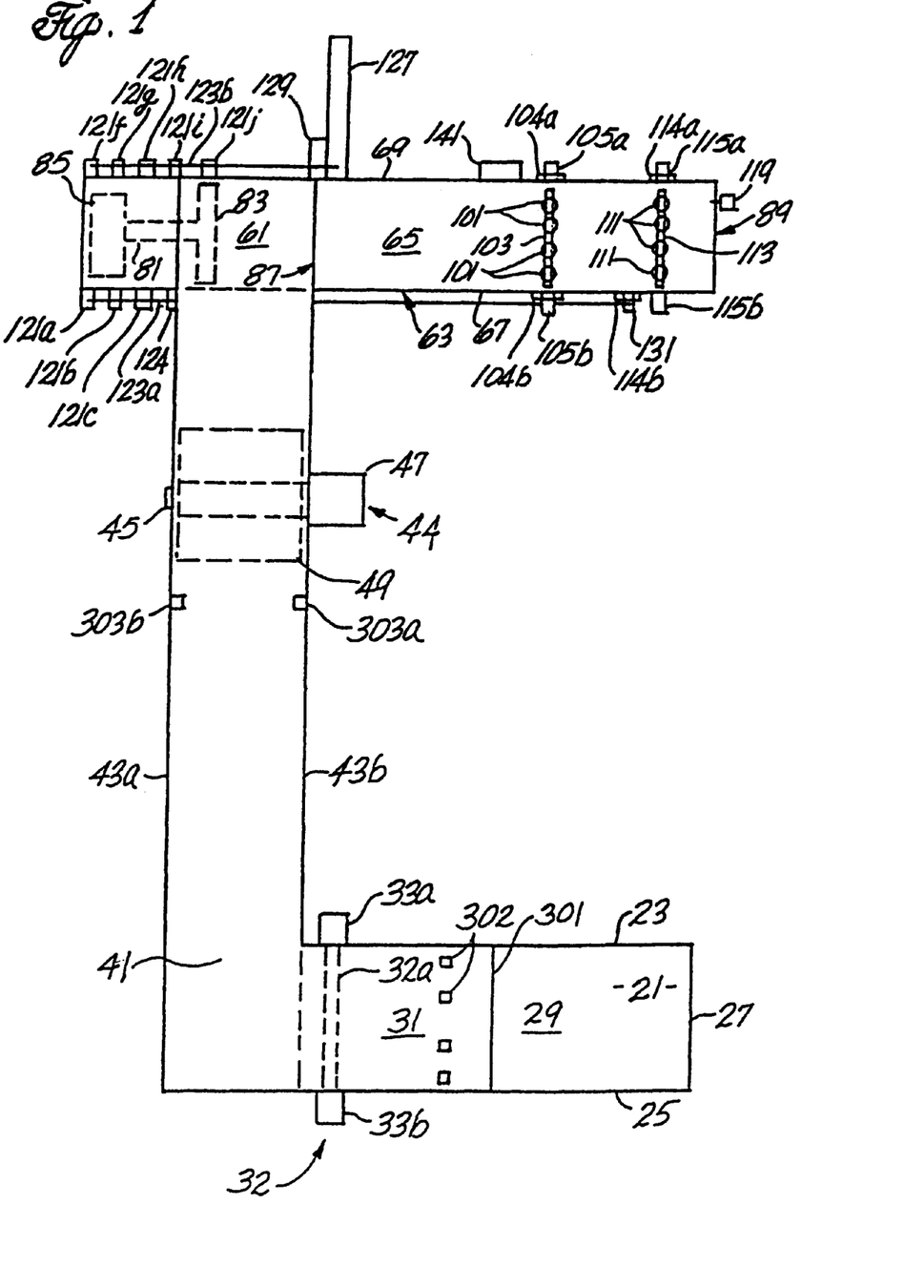
FIG. 1 is a top view of an embodiment of the hay texturizing and baling apparatus of the present invention.
Figure 2:
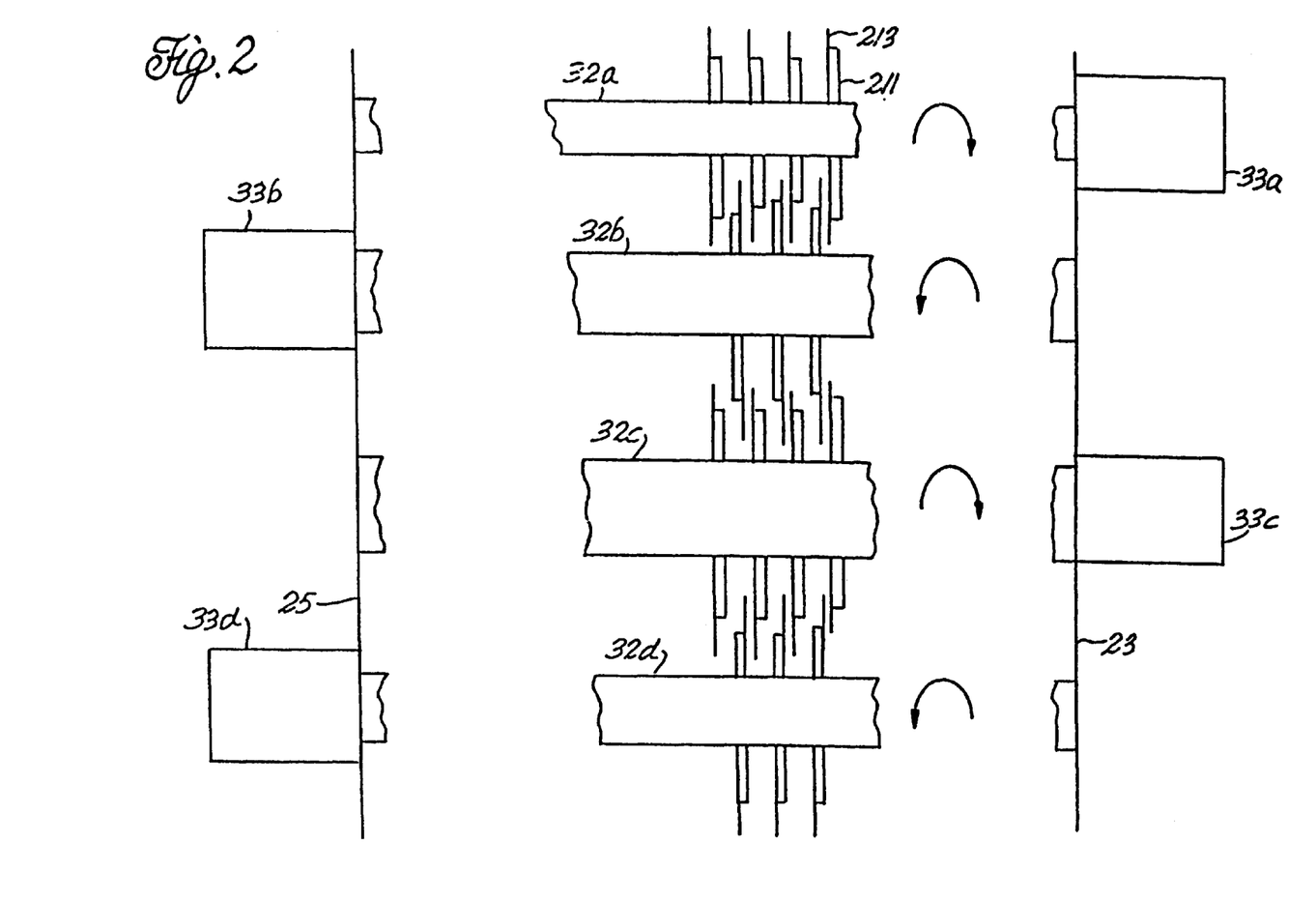
FIG. 2 is a front view of the counter rotating blades of the hay texturizing and baling apparatus of FIG. 1.

Referring now to the drawings, a hay texturizing and baling apparatus of the present invention is shown in FIG. 1. Hay is fed into the apparatus at a hopper 21. The hopper has a conveyor floor 29, two side walls 23, 25 and a front 27. The hay is placed on the conveyor 29 in a loose manner, preferably by mechanical means such as the use of a front loader or other mechanism. The conveyor carries the hay into a housing which shares sides 23, 25 with the hopper and additionally includes a top 31. The housing contains a separating drums of a "shredder" 32. As will be more fully discussed below, the shredder is comprised of cylinders 32a–d mounted in a generally vertical plane and transverse to the conveyor, to which fins or blades 210, shown in FIG. 2, are attached. Each cylinder 32a–d is driven by a motor 33a–d, the motors for adjacent cylinders being mounted on opposite sides of the housing. The cylinders rotate relatively slowly and serve to bend or break hay fibers and also disentangle or separate the hay fibers, rather than rotating rapidly enough to shatter the hay, which would cause loss of leaves. Moisture added to the hay immediately before or within the shredder brings excessively dry hay to a moisture content that inhibits loss of leaves.

After the hay passes through the shredder 32 the hay is carried by a second conveyor belt 41 past a leveler 44. The leveler 44 has leveling beams 49 mounted to a leveling cylinder 45 driven by a motor 47. The leveler spreads hay uniformly on the second conveyor, preventing large clumps of hay from being transported. After the second conveyor belt 41 transports the hay past the leveler 44 the hay is deposited into a second hopper 61.

The conveyors are conventional conveyors for hay having a smooth floor and transverse bars that are dragged along the floor by roller chains at each side of the conveyor. The bars drag hay along the conveyor.

Coupled to the second hopper 61 is a conduit 63. The conduit 63 has a top 65, a bottom 68 (shown in FIG. 6), and longitudinal sides 67, 69 which provide the conduit with a substantially rectangular cross-section. The conduit has an upstream opening 87 adjacent to the second hopper 61 and a downstream opening 89. A hydraulic ram 81 is coupled to a hydraulic pump 85 along a longitudinal axis of the conduit opposite the upstream opening 87 of the conduit. Attached to the ram 81 is a pusher plate 83. As hay is fed into the second hopper 61, the ram 81, and thereby the pusher plate 83, periodically traverses the second hopper 61, thereby forcing hay into the upstream opening 87 of the conduit. As additional hay is fed into the second hopper the ram and the pusher plate cyclically forces such additional hay into the upstream opening of the conduit, and the additional hay in turn forces hay previously forced into the conduit to travel longitudinally through the conduit towards the downstream opening. Thus, the hay is moved by the pusher plate 83 in a peristaltic manner, that is, movement occurs periodically.

A plate 103 is coupled to the top 65 of the conduit towards the downstream end of the conduit. Coupled to the plate 103 are hydraulic cylinders 101. Similar plates 104a, 104b and hydraulic cylinders 105a, 105b are mounted in a vertical row along the side walls 69, 67 in approximately the same plane as the plate 103 and cylinders 101. The hydraulic cylinders 101, 105a, 105b exert pressure against the top and side plates 103, 104a, 104b, respectively, thereby forcing the top towards the bottom and the sides towards each other.

The top and sides are hinged by hinges 174 at the upstream opening 87, but allowed some inward and outward movement at the downstream opening, so as to allow some slight movement in the described directions. As the hay travels longitudinally through the conduit additional compaction is achieved through the pressure applied by top and sides of the conduit. More importantly, as the hay travels through the conduit the hay in contact with the top, bottom and sides, it encounters a frictional force oppositely directed to the motion of the hay. This frictional force resists the movement of the hay and thereby allows for greater compaction of the hay by the ram.

The pivoting of the sides and top of the conduit as driven by the hydraulic cylinders causes the walls of the conduit to converge slightly in the downstream direction when the top and sides are pressed inwardly. This convergence, and the greater normal force applied to the hay in the conduit, significantly increases the frictional force resisting advance of the hay through the conduit. In effect, the hay is being jammed into a converging passage from which it is squeezed out only with difficulty. The high pressure applied by the ram against the frictional force opposing the motion of the hay compresses the hay.

The first part of the cycle of operation is for the walls of the conduit to converge. The ram and pusher plate pick up additional hay from the second hopper and press it against the hay already in the conduit. The hay is squeezed forward and compressed against the hay restricted by friction on the converging walls. The ram then retracts and the walls open up slightly, permitting the compressed hay to spring back a small amount. Some of the hay extrudes from the downstream opening of the conduit.

To further increase the compressive force on hay in the conduit a second set of top and side plates and hydraulic cylinders are utilized, with a plate 113 mounted transversely across the top 65 of the conduit along with associated hydraulic cylinders 111. Included also are side plates 114a, 114b and associated hydraulic cylinders 115a, 115b.

A sensor 119 is coupled to the top of the downstream opening 89 of the conduit. After the sensor has determined that a predetermined quantity of hay has been extruded from the downstream opening 89 of the conduit the sensor signals the operation of a gate 127. The gate 127 is caused to traverse across a longitudinal axis of the conduit by a motor 129. Attached to the gate are wire cables 123b which are coiled in rolls 121a–e. As the gate traverses the conduit the wires 123b, attached to the gate at various heights, are pushed through the hay transverse to its direction of travel. Thereafter, as the hay is forced through the conduit the wires passed through the hay travel with the hay until the wires reach a twister 131. As the wires reach the twister 131 the twister ties and cuts the wires, thereby forming a hay bale of a substantially predetermined size. The aforementioned conduit and associated devices are commercially available from Recycle Systems of Issaquah, Washington.

FIG. 2 shows further details of the shredder 32. The shredder is commercially available from Cooper Equipment, Inc., of Burley, Idaho. A plurality of rotating cylinders 32a–d are mounted to the sides 23, 25 of the hopper 29 and thereby traverse the hopper. The cylinders are mounted in a vertical plane, that is, the cylinders 32a–d are mounted vertically above one another. Each cylinder is caused to rotate slowly by motors 33a–d mounted to the outside of the sidewalls of the hopper, the motors 33a–d being coupled to the respective cylinders 32a–d. The motors for adjacent cylinders are mounted on opposite sides of the hopper for clearance. Such opposing mounting is not required, but may be beneficial based on the size of the motor housing or for providing access to the motors. The motors do not cause the cylinders to all rotate in the same direction. Adjacent cylinders are rotated in opposing directions. Attached to the cylinders and extending radially from the cylinders are mounting plates 211. Texturizers 213 are attached to the mounting plates, with the texturizers 213 extending still further radially from the cylinders.

Figure 3:
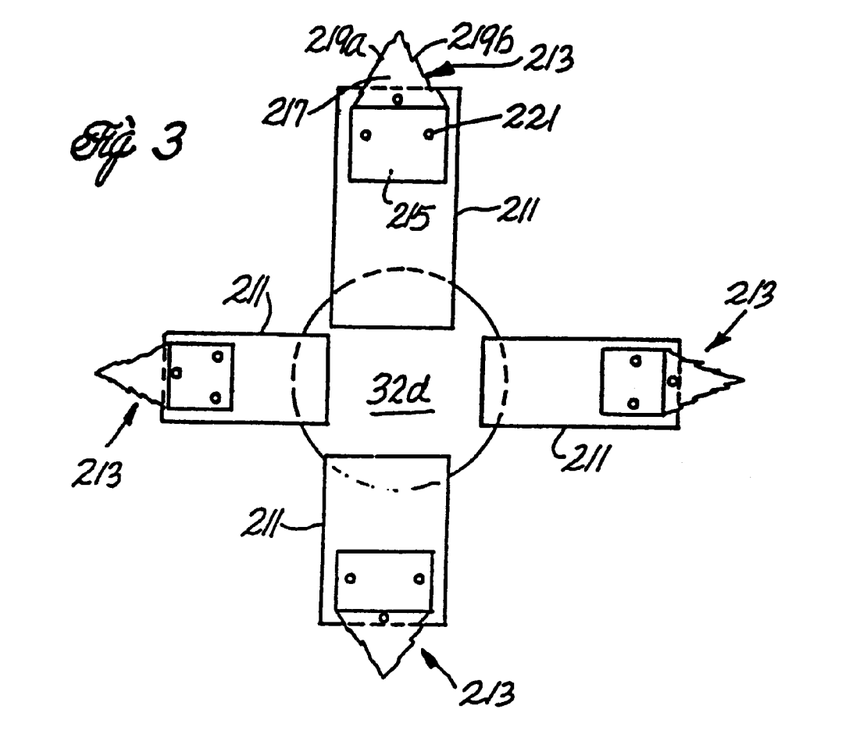
FIG. 3 is a side view of a single rotating blade of FIG. 2.

FIG. 3, a transverse cross-sectional view of an exemplary cylinder 32d, illustrates the mounting plates 211 and attached texturizers 213. As can be seen in FIG. 3, a plurality of mounting plates are attached to the cylinder. In the present embodiment, four mounting plates are attached to the cylinder at each of many locations along the length of the cylinder. Each mounting plate extends radially from the cylinder and at 90° from adjacent mounting plates in the set. The texturizers 213 have a rectangular base 215 which is attached to the mounting plate via rivets 221. A variety of attachment methods may be used in place of the rivets, such as screws, bolts and nuts, or other methods. Extending from the base 215 is a triangular texturizing blade 217. The texturizing blade has jagged edges 219a, 219b to texturize the hay.

Figure 4:
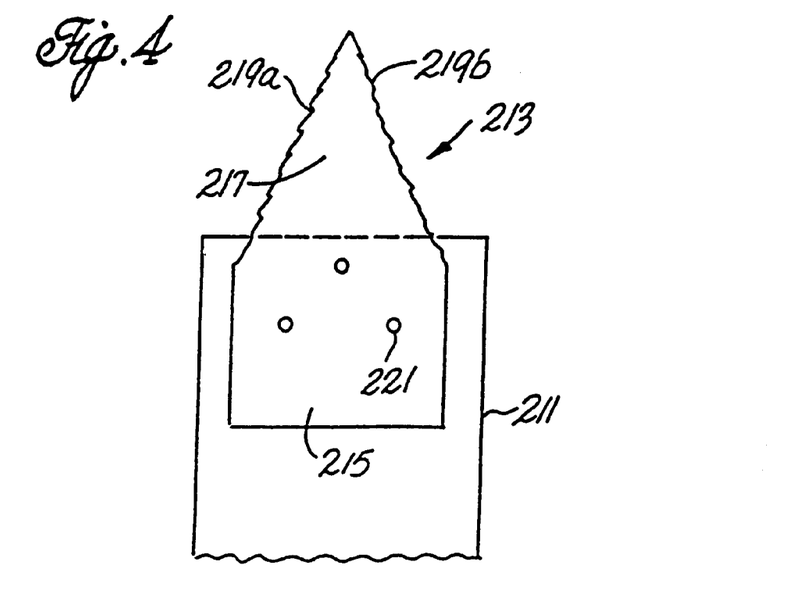
FIG. 4 is a front view of a blade of the rotating blade of FIG. 3.

Additional details of the texturizing blades may be seen in FIG. 4. The jagged edges have a serrated surface. The serrated surface is capable both of cutting stalks of hay as well as causing stalks of hay to be lodged between the serrations.

Returning now to FIG. 2, it may be seen that as hay is passed into the shredder some of the hay will be cut by the jagged edges and some of the hay will be caught by the jagged edges and rotated into contact with the texturizing blades 217 extending from adjacent cylinders. In such a way the hay fiber length will be reduced by the cutting of the hay stalks by the texturizing blades 217, with a fiber length of six to eight inches preferred. The hay fibers are also somewhat separated from each other, bent, buckled and softened through contact with the texturizing blades both singly and via the opposing contact with texturizing blades coupled to adjacent cylinders. The cylinders rotate slowly enough that the hay fibers are not broken by impact, but instead are cut or bent by engagement with pairs of adjacent blades. Additionally, some of the hay undergoes multiple passes through the shredder because adjacent cylinders are rotated in opposing directions. The bottom cylinder is rotated in a direction that tends to sweep some of the hay from the first conveyor toward the second conveyor, and some of the hay into the blades of the second cylinder which force the hay away from the second conveyor.

Fewer or greater numbers of blades and varied spacing may be used on the rotating drums of the shredder to obtain loosely separated hay, cut to the preferred fiber length and bent into shorter, more readily chewed lengths.

Referring again to FIG. 1, after the hay passes through the shredder it is deposited onto a second conveyor 41. The second conveyor passes the hay past a moisturizer 303 and the leveler 44. The moisturizer 303 sprays a very fine mist or fog of water over the hay. The water reduces the amount of loose airborne material associated with the hay. More importantly, a hay moisture level of 9% to 15% is desirable for shipping purposes and to promote leaf retention both during compacting and shipping.

Thus, in a preferred arrangement, a primary moisturizer is used in the shredder. A shroud 301 closes most of the front of the shredder except for a narrow passage near the input conveyor 29 for introducing hay into the shredder. The outlet of the shredder is into the underlying hopper over the second conveyor 41. Atomizers 302 in the shredder eject a very fine mist or fog of water that keeps the humidity inside the shredder quite high and probably partly settles onto hay in the shredder. The addition of a fine mist of water in the substantially closed shredder uniformly raises the moisture content of the hay as it is thoroughly mixed and texturized. A fine mist in the closed shredder is preferred since moisturizing is more uniform than with water sprayed directly on the hay. Uniformity is desirable to avoid overly wet portions of the hay that may mildew.

The amount of water utilized by the moisturizers is controlled manually based on the initial moisture content of the hay fed into the shredder and the desired moisture level of the baled hay.

Figure 5:
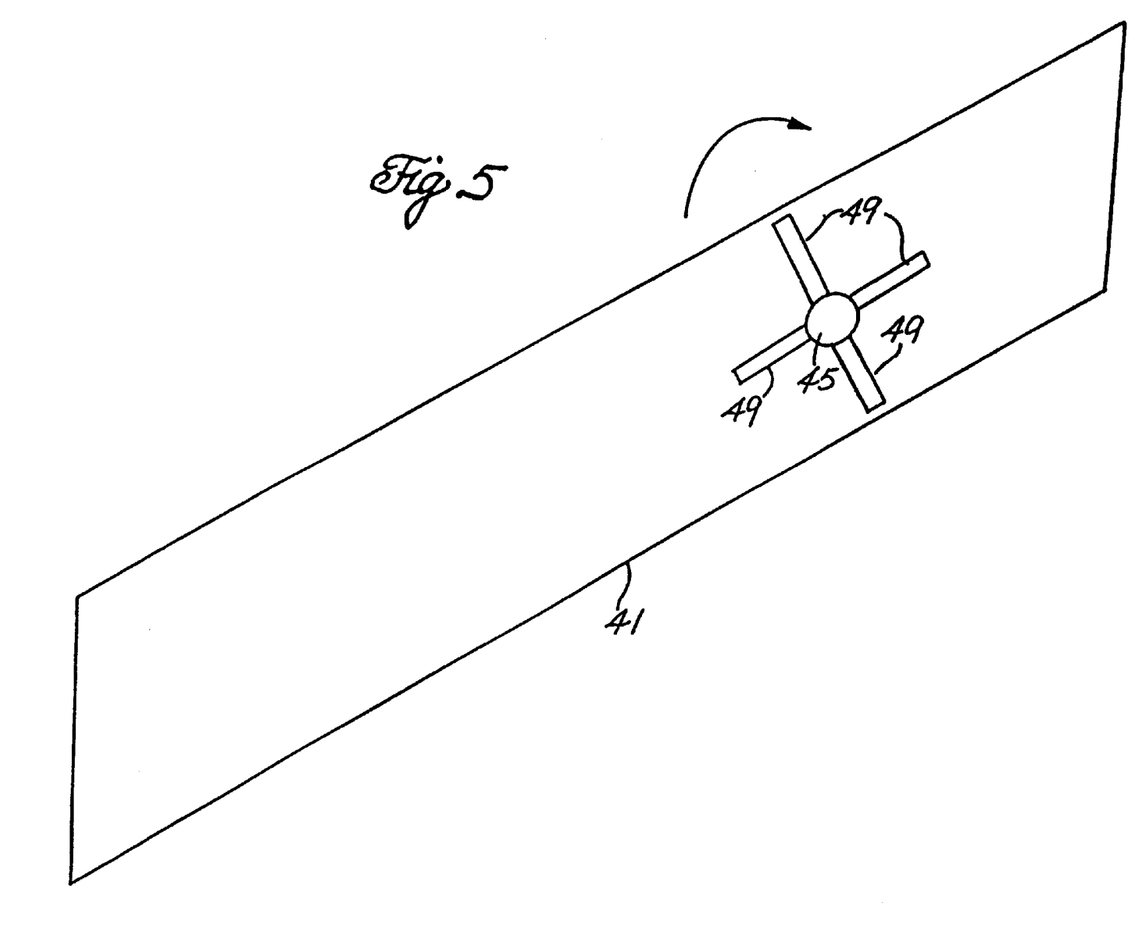
FIG. 5 is a side view of a leveler of the hay texturizing and baling apparatus of FIG. 1.

The leveler 44 on the second conveyor has a leveling cylinder 45 mounted to the sidewalls 43a, 43b above and transverse to the direction of motion of the second conveyor 41. The leveling cylinder 45 is rotated by a motor 47 mounted to the outside of the sidewall. Referring now to FIG. 5, four leveling beams 49 extend radially from the leveling cylinder 45 so as to come close to contacting the conveyor. The leveling beams thereby only allow a limited amount of hay to pass beneath the leveling beams since the direction of rotation of the leveling cylinder is such that the leveling beams move in the opposite direction from the motion of the second conveyor. A limited amount of hay is also carried over the leveling cylinder by the leveling beams. This allows a substantially predetermined amount of hay to pass the leveler over a period of time. Additionally, the contact between the leveling beams and the hay may further texturize the hay.

Referring again to FIG. 1, after the second conveyer passes the hay through the leveler, the second conveyer deposits the hay into the second hopper 61. The second hopper is bounded on two parallel sides by retaining walls. A third side of the second hopper is bounded by the pusher plate 83. Opposite the pusher plate is the upstream opening 87 of the conduit.

On a periodic basis, the pusher plate is driven towards the upstream opening of the conduit by the ram 81. As the pusher plate sweeps across the second hopper 61, the hay in the second hopper is forced into the upstream opening of the conduit. As the pusher plate forces hay into the upstream opening of the conduit, hay already present in the conduit is forced towards the downstream opening of the conduit and becomes compacted. This compaction does not occur through the pressing of the hay against a rigid plate because the hay is forced directly towards the downstream opening. Instead, the hay is compacted by being pressed against-a somewhat resilient mass of hay. That is, the hay already present in the second conduit provides the resistive force against which the additional hay being forced into the second conduit is pressed. That the hay is not pressed against a rigid plate provides benefits by allowing for greater leaf retention.

As previously described, the mass of hay already present in the conduit provides the resistive force against which additional hay is pressed by the ram and the pusher plate. As the hay travels from the upstream opening towards the downstream opening of the conduit, the hay is further compressed as, along any cross-section of the conduit, hay is being pressed forward by hay closer to the upstream opening and pressed against hay closer to the downstream opening. Thus, the hay is continually compacted as it travels through the conduit.

Figure 6:
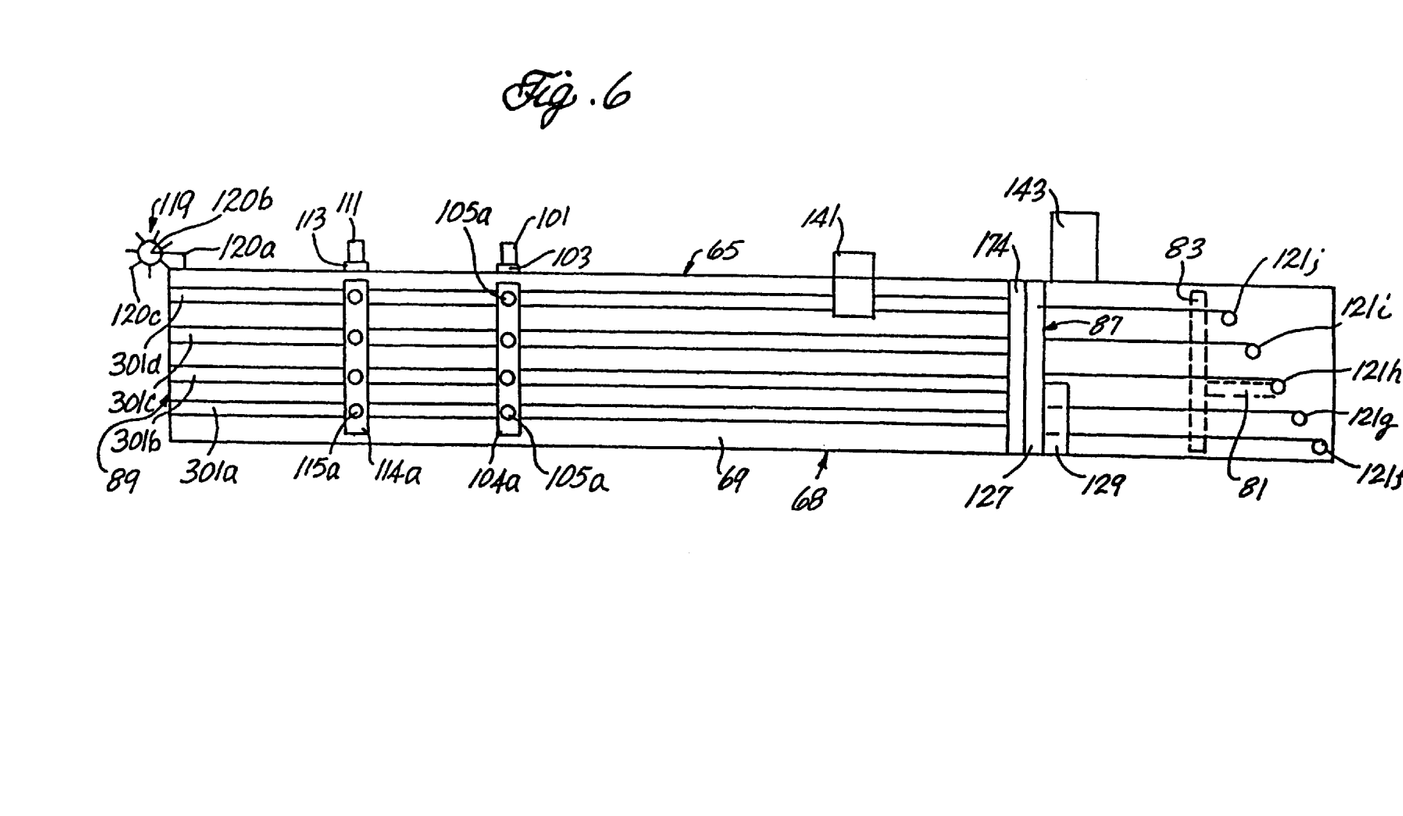
FIG. 6 is a side view of the compression conduit of the hay texturizing and baling apparatus of FIG. 1.

Referring now to FIG. 6, the upstream opening of the conduit provides an opening of a predetermined size, in the described embodiment 43"×43". The walls and the top, however, are hinged at the upstream opening. These hinges allow the side walls and the top to be moved towards the center axis of the conduit, so as to transversely compress the conduit and the hay therein. In the present embodiment this movement results in the downstream opening of the conduit having a dimension of 42"×42".

The operation of the ram 81 and the pusher 83 in forcing additional hay into the upstream opening of the conduit forces, or extrudes, hay through the downstream opening of the conduit once the conduit is full. As the hay is extruded through the downstream opening of the conduit the hay contacts radial spokes 120c of the sensor 119. The sensor has a wheel 120b mounted to the top of the conduit via an L-bracket 120a. Extending radially from the wheel 120b are spokes 120c. The extrusion of the hay from the downstream opening causes the wheel to rotate due to contact between the hay and the spokes. The amount of rotation of the wheel is monitored by a controller 141, 143. In the present embodiment the controller comprises an SLC-500 by the Allen-Bradley Company. As the wheel has a predetermined radius, the controller is able to determine the length of the extruded block of hay. Once a predetermined amount of hay has been extruded from the conduit, the controller will stop operation of the ram and the pusher plate. The controller also signals the motor 129 to extend and thereafter retract the gate 127 across the longitudinal axis of the conduit for passing wires through the hay in the conduit. Upon completion of gate operation, described below, the controller reenables operation of the ram.

Figure 7:
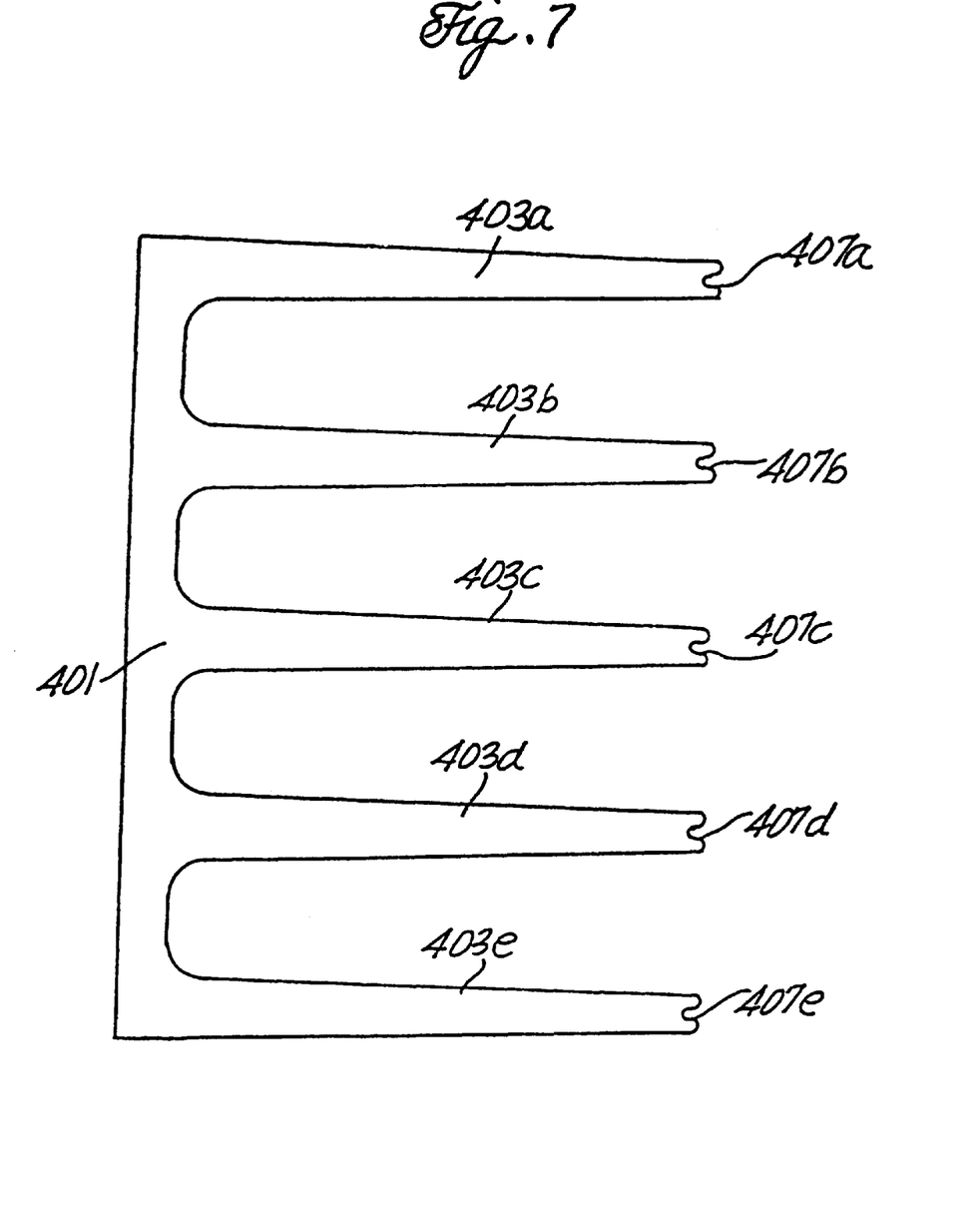
FIG. 7 is a side view of the gate of the hay texturizing and baling apparatus of FIG. 1.

The gate 127 is illustrated in FIG. 7. The gate has a vertical spine 401. Extending from the spine 401 are a plurality of prongs 403a–e. The prongs narrow as they extend from the spine. The ends of the prongs are notched. Referring again to FIG. 6, a plurality of spools of wires 121f–j are mounted to the outer side wall of the second hopper. The wire from the spools is passed through the notches of the prongs of the gate. When the gate is forced to traverse the longitudinal axis of the conduit, the notches carry wire from the spools through the hay present in the conduit. This causes a doubled up, or U-shaped, portion of the wire to extend through the hay. As the hay travels through the conduit, this doubled up portion of the wire travels with the hay causing additional wire to unspool from the spools. After a predetermined quantity of hay has been extruded through the downstream opening of the conduit, the controller will again signal the motor 129 to force the gate through the longitudinal axis of the conduit. This causes a second doubled up, or U-shaped section of the wires to be forced through the hay. Thus, a block of hay is now bounded on three sides by wire.

Referring now to FIG. 1, additional wire spools 121a–e are mounted to the outside of the opposing side wall of the second hopper 61. Wires from the second spools 121a–e extend down the length of the conduit to the twister 131. The twister cuts the U-shaped portion of the wire and ties the wires extending from spools 121a–e to the trailing edge of the U-shaped portion of the wires. This tying operation is accomplished by twisting the wires together. As the hay is further forced through the conduit, the wires from the spools 121a–e travel with the hay until the twister encounters a second set of U-shaped wires. Once this occurs, the twister cuts the U-shaped wires into two separate pieces and then ties the trailing edge to the trailing U-shaped wire and the leading edge to the leading section of the U-shaped wire. Thus, hay of a specified length is bounded on four sides by wires, and a bale of hay is thereby formed, which has a density of approximately 27 lbs./cu. ft. in the present embodiment.

Figure 8:
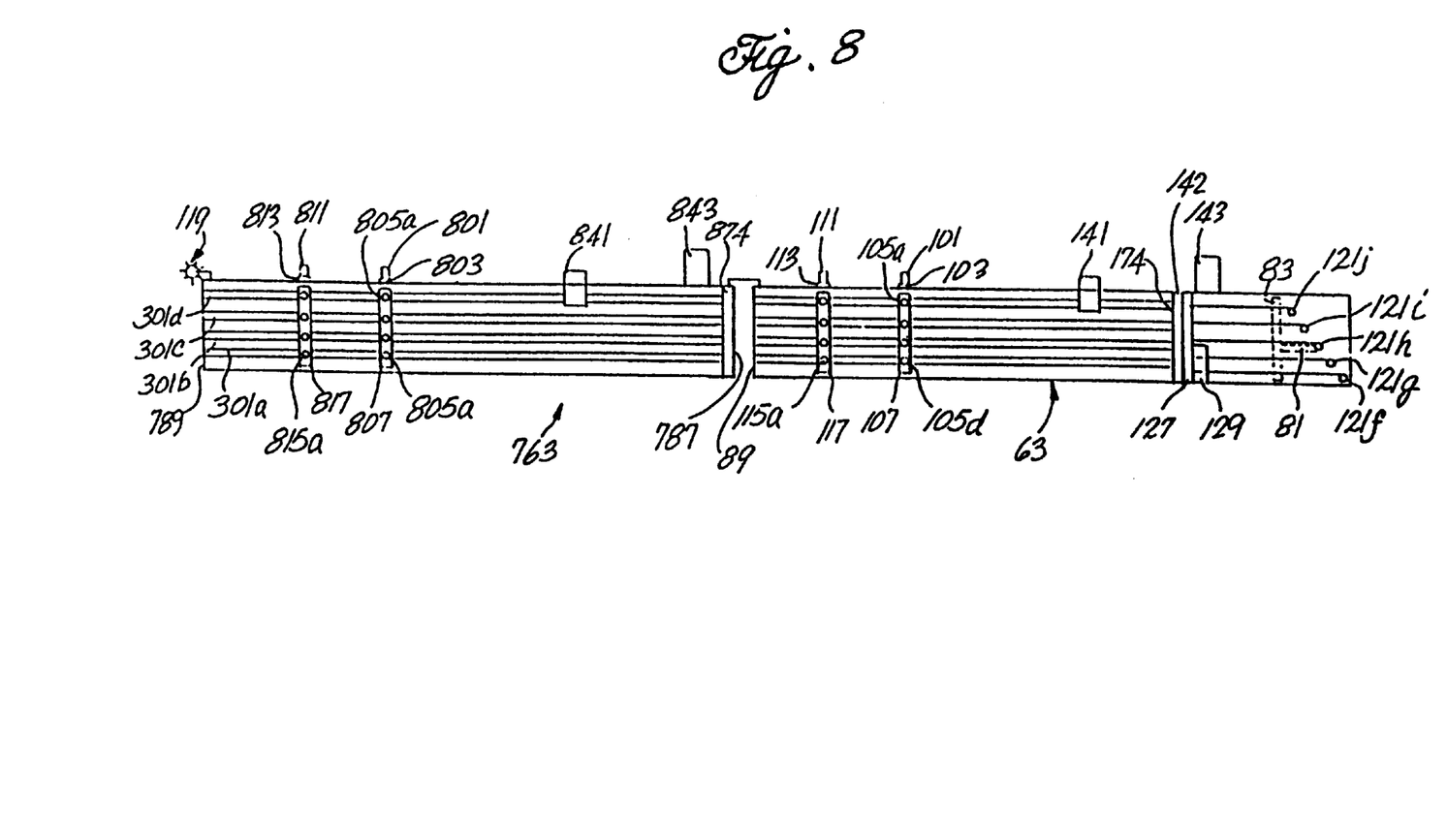
FIG. 8 is a side view of an alternative embodiment of the baling portion of the hay texturizing and baling apparatus of the present invention.

Further compression of the hay is achieved by the alternative embodiment shown in FIG. 8. This alternative embodiment utilizes increased conduit length, as well as increased hydraulic pressure, to achieve greater hay density. In this embodiment a second conduit 763 is placed adjacent and coupled to the downstream opening 89 of the conduit 63 such that a upstream opening 787 of the second conduit 763 abuts the downstream opening 89 of the conduit 63. The second conduit 763 is also placed so as to share the same longitudinal axis as that of the conduit 63.

In this embodiment the sensor 119 is removed from the location at the downstream opening 89 of the conduit 63, and is instead placed at a downstream opening 789 of the second conduit 763. Similarly, the twister 131 is not used. Instead, a second twister (not shown) mounted alongside the second conduit 763 towards the downstream opening 789 of the second conduit 763 is used.

Doubling the effective length of the conduit provides increased frictional resistance due to the greater surface area provided by the second conduit 763. Additionally, the greater mass of hay present in the combined conduits 63, 763 results in increased resistance to further movement of the hay, and thereby also increases compression of the hay. To further provide additional compression of the hay, the pressure of the hydraulic actuator 85, which drives the ram 81 and the pusher plate 83, is increased. The hydraulic pressure driving the hydraulic cylinders 101, 105, 111, 115, is also increased. This hydraulic pressure is also used to drive hydraulic cylinders 801, 805, 811, 815 of the second conduit 763. The application of the greater hydraulic pressure results in greater compressive forces being applied by the pusher plate 83, and increases frictional forces resisting the pusher plate 83 due to the increase in the normal force applied by the hydraulic cylinders 101, 105, 111, 115, 801, 805, 811, 815.

The hydraulic cylinders along the separate conduits are independently controlled. The lateral compression and amount of convergence of the walls of each conduit can be varied to change the resistance to movement of hay through each conduit. Thus, for example, the second, downstream conduit may be left with slight convergence and the first, upstream conduit with maximum convergence. In such a case most of the compression of the hay occurs in the first conduit and the compressed hay passes through the second conduit with little, if any, additional compaction. By using maximum convergence in both conduits, a high degree of compaction and highest density of the hay can be obtained.

Although this invention has been described in certain specific embodiments, many additional modifications and variations will be apparent to those skilled in the art. It is therefore to be understood that this invention may be practiced otherwise and is specifically described. For example, modifications could be made to the texturing blades or to the conduit tunnel. Thus, the present embodiments of the invention should be considered in all respects as illustrative and not restrictive, the scope of the invention to be indicated by the appended claims rather than the foregoing description.

What is claimed is:

1. A method for texturizing and compacting livestock feed comprising:

receiving feed into a first hopper;

texturing the feed with a shredder;

conveying the feed from the first hopper to the shredder with a first conveyor;

conveying the feed from the shredder to a second hopper with a second conveyor;

leveling the feed on the second conveyor with a leveler;

pushing the feed from the second hopper with a ram having a pusher plate movable through the second hopper;

receiving into an upstream opening of a conduit the feed pushed from the second hopper by the ram; and defining a bale of feed using a gate movable across the upstream opening of the conduit.

2. The method of claim 1 wherein the conduit has a longitudinal length extending along a longitudinal axis from the upstream opening to a downstream opening, the conduit having walls along the longitudinal length with the walls extending from the upstream opening to the downstream opening in a converging manner.

3. The method of claim 1 further comprising exerting a transverse force against feed in the conduit by providing conduit walls that are movable towards the longitudinal axis.

4. The method of claim 1 further comprising determining the amount of feed passed through the conduit with a sensor.

5. The method of claim 4 further comprising operatively coupling the sensor and the gate with a controller that controls movement of the gate.

6. The method of claim 5 further comprises providing a rotatable wheel mounted at the downstream opening of the conduit as the sensor.

7. The method of claim 1 further comprising providing a plurality of contra rotating cylinders in the shredder, wherein each cylinder has a plurality of radiating blades which pass adjacent to radiating blades on an adjacent cylinder.

8. The method of claim 7 wherein the radiating blades have serrated edges.

9. A method for texturizing and compacting livestock feed comprising:

provideing a plurality of contra rotating cylinders with blades radiating from the cylinders;

operatively coupling a hopper to the plurality of contra rotating cylinders so as to receive feed passed by the plurality of contra rotating cylinders;

providing a ram having a pusher plate movable through the hopper;

providing a conduit with an upstream opening positioned to receive feed pushed from the hopper by the ram; and defining a bale of feed using a gate movable across the upstream opening of the conduit.

10. The method of claim 9 wherein the conduit has a downstream opening, a longitudinal length extending along a longitudinal axis from the upstream opening to the downstream opening, the conduit having walls along the longitudinal length extending from the upstream opening to the downstream opening in a converging manner.

11. The method of claim 10 further comprising providing walls of the conduit that are movable towards the longitudinal axis so as to exert transverse force against feed in the conduit.

* * * * *